United States Patent [19]

Peterson

[11] Patent Number: 4,679,751
[45] Date of Patent: Jul. 14, 1987

[54] WEAPON DISPENSING SYSTEM FOR AN AIRCRAFT

[75] Inventor: Paul F. Peterson, Rancho Palos Verdes, Calif.

[73] Assignee: Lockheed Corporation, Calabasas, Calif.

[21] Appl. No.: 857,004

[22] Filed: Apr. 29, 1986

[51] Int. Cl.$^4$ ................................................ B64D 1/06
[52] U.S. Cl. .................................... 244/137.4; 89/1.54
[58] Field of Search ........................ 244/137 R, 137 A; 89/1.54, 1.59, 1.58, 1.57

[56] References Cited

U.S. PATENT DOCUMENTS

| | | | |
|---|---|---|---|
| 2,481,542 | 9/1949 | Schuyler | 89/1.54 |
| 3,008,376 | 11/1961 | Brunow et al. | 89/1.54 |
| 3,273,459 | 9/1966 | Landin | 89/1.54 |
| 4,440,365 | 4/1984 | Holtrop | 89/1.54 |
| 4,600,171 | 7/1986 | Kalisz | 244/137 A |

FOREIGN PATENT DOCUMENTS

744609  2/1956  United Kingdom ............ 244/137 A

*Primary Examiner*—Joseph F. Peters, Jr.
*Assistant Examiner*—Rodney Corl
*Attorney, Agent, or Firm*—Louis L. Dachs

[57] ABSTRACT

The invention is a weapon dispensing system for an aircraft. The system includes a weapon positioning assembly for positioning the weapon in a stored position and a release position. The weapon positioning assembly comprises a weapon support rack and a pair of fore and aft links having first and second ends. The first ends of the links are pivotally coupled to the aircraft and the second ends are pivotally coupled to the rack. An actuator assembly is coupled by its first end to the aircraft and by its second end to the weapon positioning assembly. It is adapted to move the positioning assembly from the stored position to the release position. Fore and aft weapon attaching devices for releasably locking the weapon to the rack is attached to the weapon positioning assembly. The weapon releasing devices are adapted to lock the weapon to the rack when the weapon position assembly is in the stored position and to only unlock the weapon from the positioning assembly when it is in the release position. Thus, upon actuation, the rack with the weapon locked thereto is rotated in a downward and forward direction and automatically released when the release position is reached.

9 Claims, 13 Drawing Figures

WEAPON DISPENSING SYSTEM FOR AN AIRCRAFT

TECHNICAL FIELD

The invention relates to the field of weapon mounting and ejection system for aircraft and, in particular, to a system which forcibly ejects the weapon from the aircraft.

BACKGROUND INFORMATION

On low speed, subsonic aircraft, weapons whether carried on the wing, underside of the the fuselage or within a weapon bay, can be gravity dropped with acceptable separation characteristics. The weapons are released from the bomb rack and armed by mechanical arming wires after release. The very early aircraft used mechnical means to accomplish release while more modern aircraft use solenoid or power operated hooks. But, with high speed jet aircraft which fly at high subsonic and supersonic speeds, weapon release, particularly from an internal weapon bay by gravity release is dangerous and can result in unpredicatable trajectories. This occurs because at the high lever of air turbulence about the aircraft at supersonic speeds shock waves are formed which exacerbates the problem. Thus, the weapon must be physically ejected.

In one approach, the weapon is forcibly ejected from a fixed bomb rack in the weapon bay. A typical bomb rack comprises hooks for suspending and releasing the weapon, sway braces for stablizing and hydraulic or explosively actuated ejectors. In operation, the release cycle takes but milliseconds from the time the weapon is released to the forcible ejection. The ejectors can be programmed so as to vary the force at which the missile is ejected and also the pitch angle (different force levels in each ejector). Typical ejectors are diclosed in U.S. Pat. No. 4,399,968 "Controlled Output Force Actuator" by Stock et al. and U.S. Pat. No. 4,257,639, "Ejector Device for Storage" by Stock. By forcibly ejecting the weapon the exposure to turbulent air flow is kept to a minimum and the weapon will have considerable momentum so as to pass quickly through the turbulent air. This provides a more positive means of safe separation. The disadvantage is that during ejection the weapon immediately loses contact with the sway braces and stablizing is solely dependent upon the force applied to the weapon.

Another approach is to mount the rack on a parallel link assembly and lower the weapon out of the weapon bay prior to ejection. This provides stabilization and does position the weapon away from the aircraft. But, when launching missiles it is desirable to provide not only safe separation from the aircraft, but a forward velocity thereto. While the extension of the parallel links and solenoid operated hook release could be coordinated so that such a directional thrust is obtained, there would always be the possibility that the weapon would be lowered but the hooks failing to release. The resulting loads on the links and supporting structure would be quite large. Therefore, it would be desirable to have automatic mechanical release.

Thus, it is a primary object of the subject invention to provide a dispensing system for ejecting a weapon from an aircraft maintaining a postitive positional control throughout the ejection stroke.

It is another primary object of the subject invention to provide a weapon dispensing system for an aircraft for ejecting a weapon from an aircraft wherein the weapon is stored internally and positive positional control is maintained until the weapon has cleared the interior of the aircraft.

A further object of the subject invention is to provide a weapon dispensing system for an aircraft wherein the weapon is ejected at a downward and forward direction.

A still further object of the subject invention is to provide a weapon dispensing system for an aircraft wherein the pitch angle of the weapon at release can be varied without deterioration of the separation velocity.

Another object of the subject invention is to provide a weapon dispensing system for an aircraft wherein the release of the weapon from the mounting rack in the release position is automatically accomplished by mechanical means.

DISCLOSURE OF THE INVENTION

The invention is a weapon dispensing system for an aircraft. The system includes a weapon positioning means for positioning the weapon in a stored position and a release position. The weapon positioning means comprises a weapon support rack which is supported by a pair of fore and aft links. The first ends of the links are pivotally coupled to the aircraft and the second ends are pivotally coupled to the rack. Pairs of fore and aft rack restraining hooks are pivotally attached to the aircraft and engage the positioning means restraining it in the stored position. An actuator means is coupled by its first end to the aircraft and by its second end to the positioning means upon retraction of the aforementioned rack restraining hooks by means of a small actuator. It is adapted to move the positioning means from the stored position to the release position. Fore and aft weapon attaching means for releasably locking the weapon to the rack are attached to the weapon positioning means. The weapon releasing means is adapted to lock the weapon to the rack when the positioning means is in the stored position and to only unlock the weapon from the positioning means when it is in the release position. Thus, upon actuation, the rack with the weapon locked thereto is rotated in a downward and forward direction and the weapon is automatically released when the release position is reached.

The fore and aft weapon attaching means include the weapon having fore and aft conventional mounting lugs with a T-shaped cross-section. Both fore and aft links each have a pair of wedge members rotatably mounted thereto. The rack in turn incorporates fore and aft pairs of lug hooks which releaseably engage the fore and aft lugs. Attached to each hook is a cam follower in detachable engagement with the wedge members in a manner such that the cam follower attached to the forward pairs of lug hooks engage the forward pairs of wedge members and the cam followers attach to the aft pair of lug hooks engage the aft pair of wedge members. These wedge members are spring loaded into place and positively align and center the weapon on the launcher assembly automatically swaybracing the weapon. The cam followers lock the lug hooks in engagement with the lugs when the weapon positioning means is in the stored position and only unlock the hooks when the positioning means is in the release position. When the sequence starts the four rack restraining hooks are disengaged from the rack and power is fed to the actuator means which swings the weapon downward and forward. The weapon is then released near the bottom of the actuator mean stroke, causing considerable velocity in a downward and forward direction. After release of the weapon the actuator means is adapted to slow the positioning means to a stop.

Additionally, the aft link can be varied in length so as to vary the pitch angle of the weapon upon release. This is accomplished by incorporating a plurality of inline first holes in the aft link in proximity to the second end thereof. A second plurality of holes are provided in the aircraft structure. A pin is used to pivotally couple one of the plurality of first holes to one of the plurality of second holes and the length of the aft link is therefore a function of which first hole is used.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a side elevation view of the weapon dispensing system shown in the stored position.

Illustrated in FIG. 2 is a side elevation view of the weapon dispensing system shown in FIG. 1 in the release position.

Illustrated in FIG. 3 is an enlarged partial side view of the forward portion of the weapon dispensing system shown in FIG. 1.

Illustrated in FIG. 4 is a view looking downward on the weapon dispensing system shown in FIG. 3 along the line 4—4.

Illustrated in FIG. 5 is a more enlarged view of the weapon mounting system shown in FIG. 3 particularly illustrating the weapon attaching means for mounting a weapon to the weapon mounting rack.

Illustrated in FIG. 6 is a cross-sectional view of the weapon attaching means shown in FIG. 5 taken along the line 6—6.

Illustrated in FIG. 7A is a cross-sectional view of the weapon mounting system shown in FIG. 1 taken along the line 7A—7A.

Illustrated in FIG. 7B is a partial cross-sectional view similar to FIG. 7A showing the weapon dispensing system in the release position.

Illustrated in FIG. 8 is a schematic representation of the hook system for retaining the weapon dispensing system in the stored position.

Illustrated in FIG. 9A is a partial perspective view of the weapon attaching means shown in FIG. 5 with the weapon dispensing system in the stored position.

Illustrated in FIG. 9B is a view similar to FIG. 9A showing the weapon attaching means in the position when the weapon dispensing system is in the release position.

Illustrated in FIG. 10 is a cross-sectional view of an explosively actuated actuator used to drive the weapon positioning means from the stored position to the release position.

Illustrated in FIG. 11 is an enlarged cross-sectional view of the end of the actuator shown in FIG. 10.

BEST MODE FOR CARRYING OUT THE INVENTION

Figure 1:
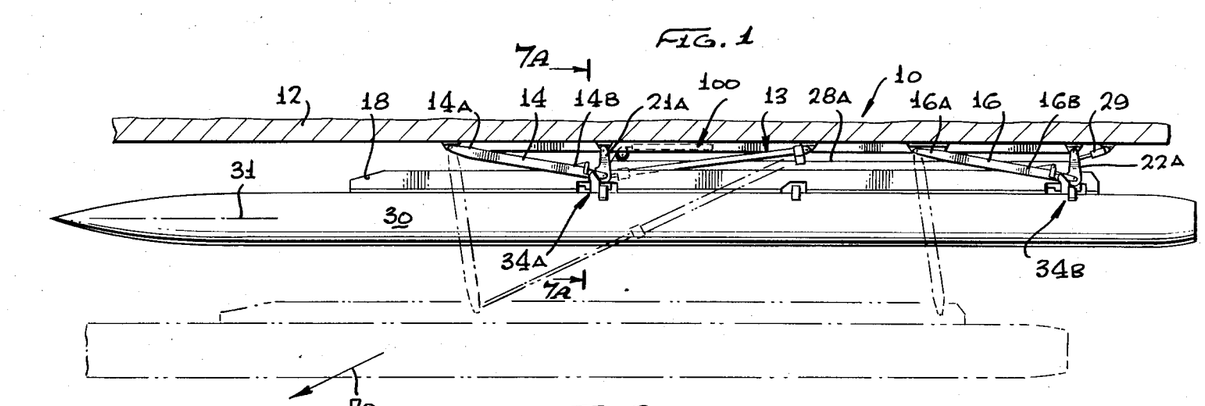
Figure 2:
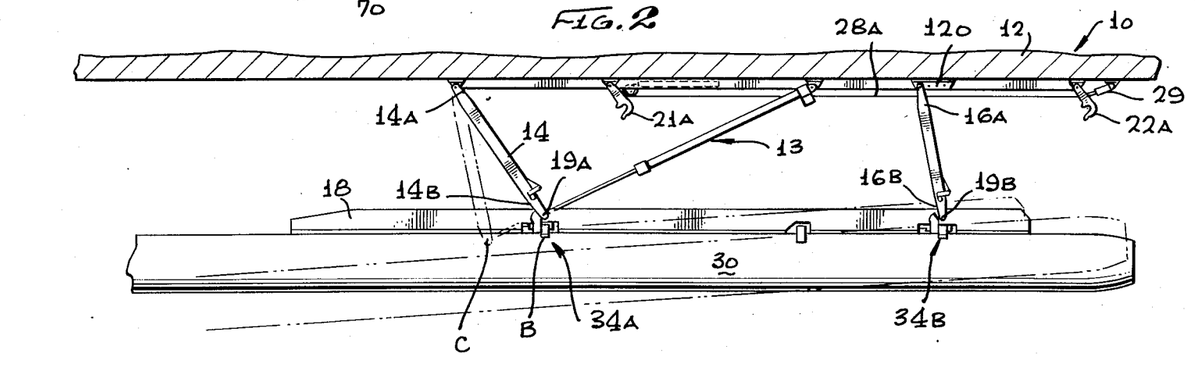
Figure 3:
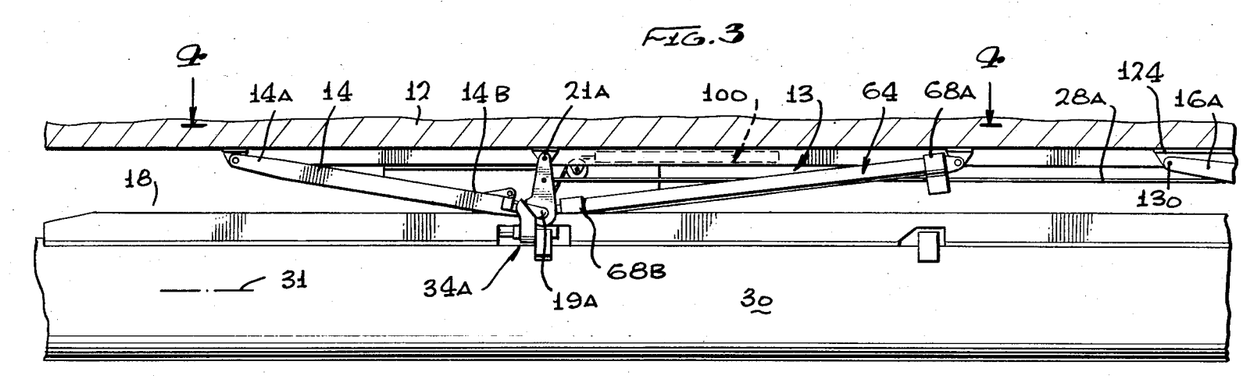
Figure 4:
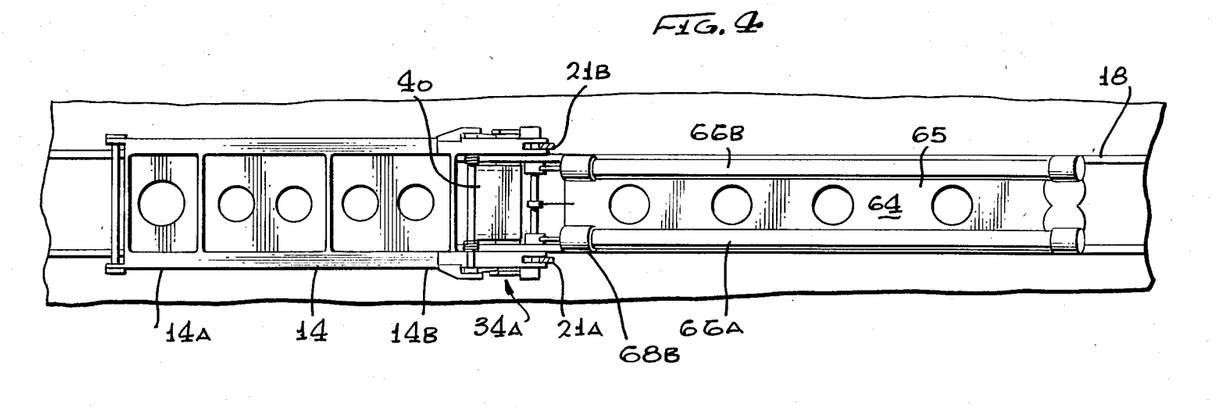
Figure 5:
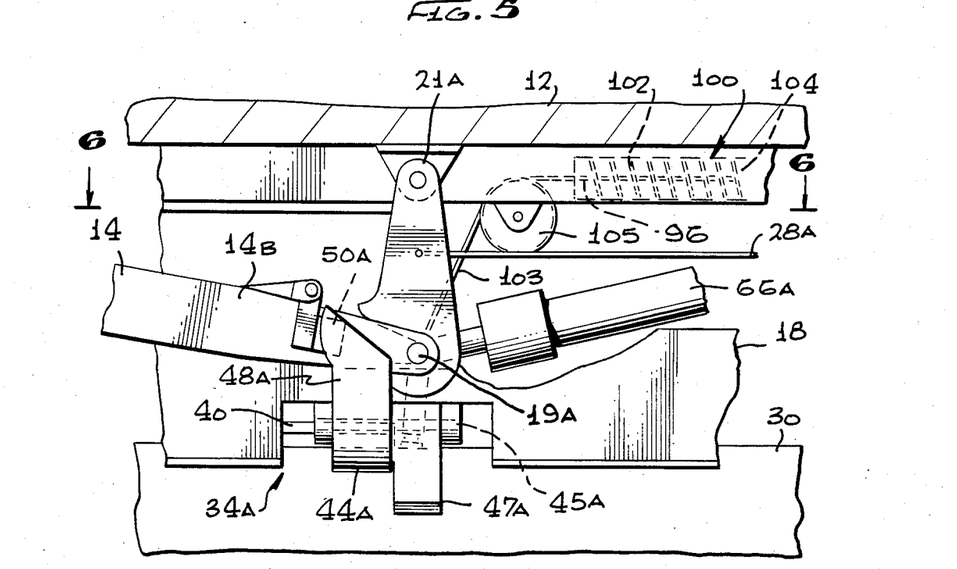
Figure 6:
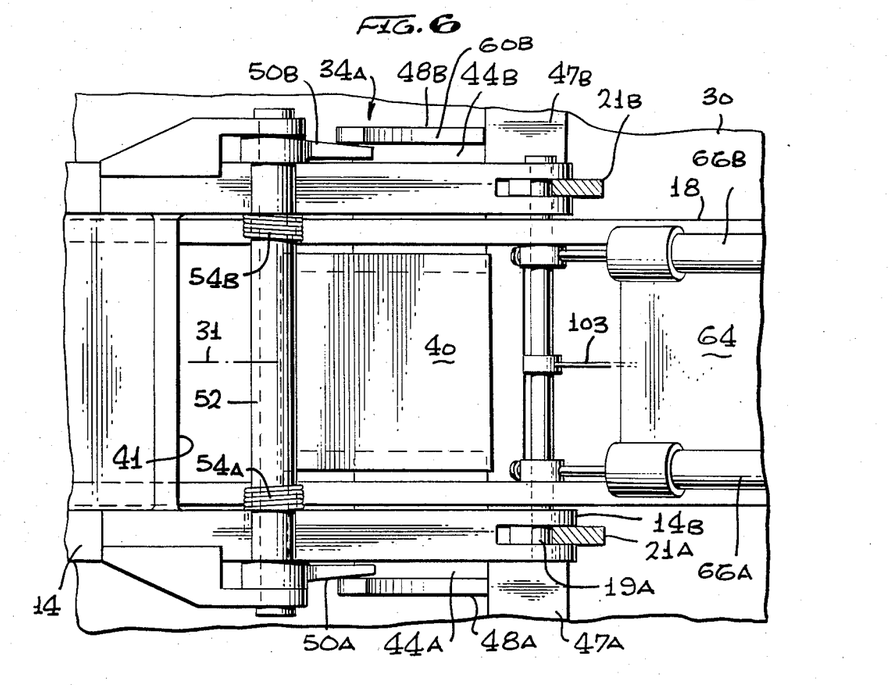

Referring initially to FIGS. 1 through 2 it can be seen that the weapon dispensing system, generally designated by numeral 10, is shown mounted to an aircraft structure 12. The system 10 can be mounted within a weapons bay or mounted to a rotary launcher therein. Although it is particularly suited for internally mounting missiles, it can also be positioned directly on the fuselage or the wings of the aircraft. The system 10 comprises a positioning means 13 which includes fore and aft links 14 and 16, respectively, having first ends 14A and 16A rotatively mounted to the aircraft structure 12 and second ends 14B and 16B mounted to a missile mounting rack 18 via pins 19A and 19B, respectively. The weapon positioning means 13 is movable from the stored position shown in FIG. 1 to a release position shown in FIG. 2.

Figure 8:
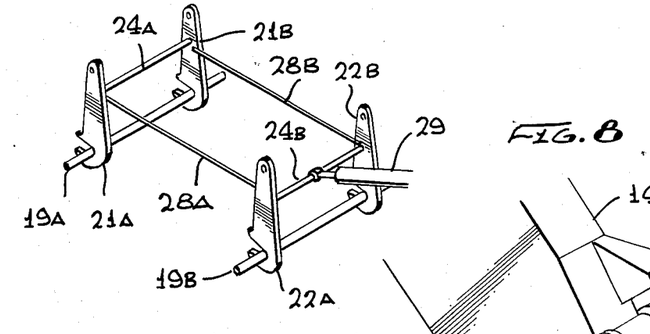
Figure 9A:
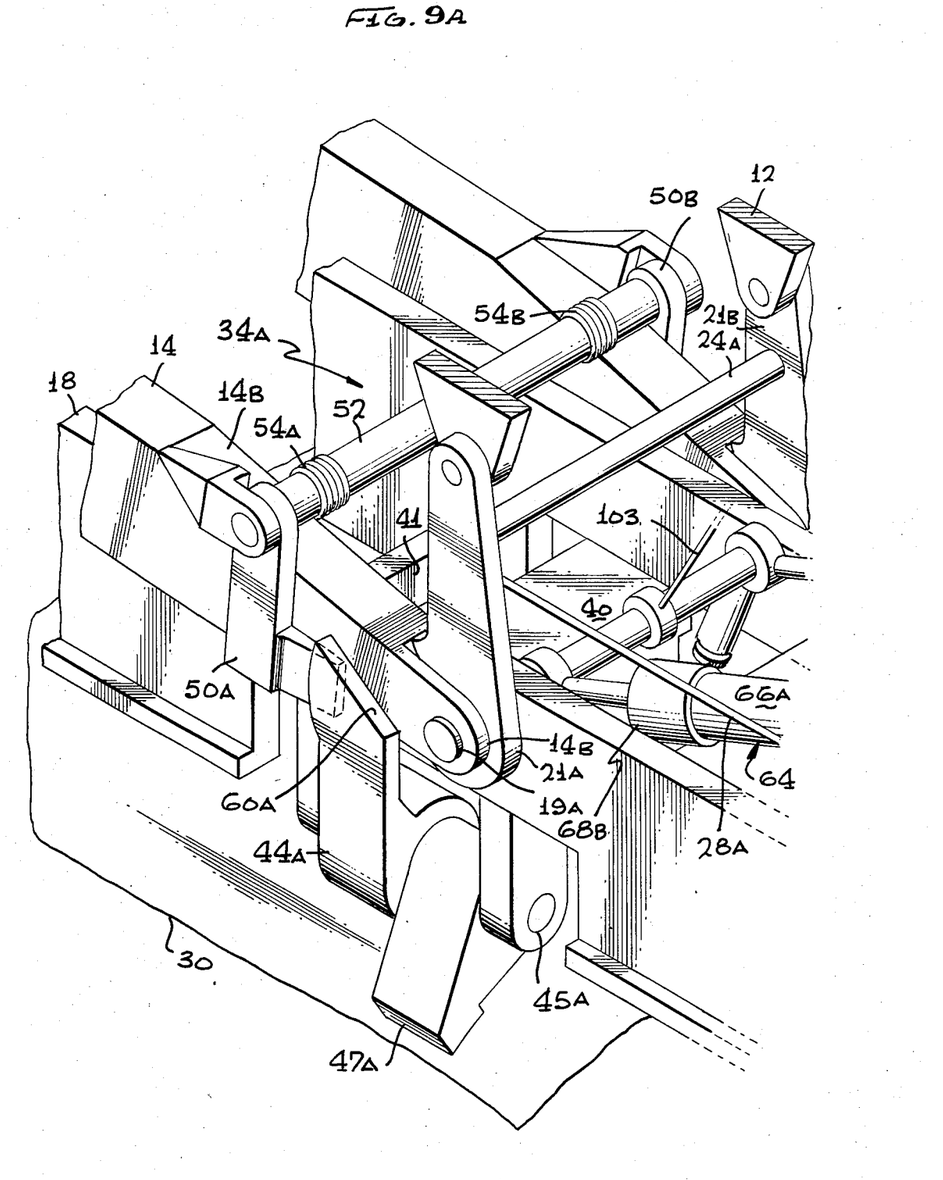

Still referring to FIGS. 1 and 2 and additionally to FIGS. 8 and 9A the positioning means 13 is held in the stored position by fore and aft sets of rack restraining hooks, 21A, 21B and 22A and 22B, respectively, all of which are pivotally mounted to the aircraft structure 12. The forward hooks 21A and 21B are cross linked by rod 24A and engage pin 19A. Hooks 22A and 22B are cross linked by rod 24B and engage pin 19B. Longitudinal links 28A and 28B are pivotally connected at their ends to hooks 21A and 22A and hooks 21B and 22B, respectively to retract. A single actuator 29 is pivotally mounted between aft rod 24B and the aircraft structure and thus upon actuation (retraction) will cause the hooks to simultaneously disengage from the pins.

Referring back to FIGS. 1 through 9B, a weapon in the form of a missile 30, having a longitudinal axis 31, is mounted to the rack 18 by means of fore and aft weapon attaching means 34A and 34B, respectively. The fore and aft weapon attaching means 34A and 34B are identical in design and function. Therefore, subsequent descriptions will be generally confined to the forward weapon attaching means 34A with the understanding that said remarks apply equally to the aft attaching means 34B.

The weapon attaching means 34A comprises a conventional mounting lug 40 (best seen in FIGS. 6 and 7A) having a T-shaped cross-section which is mounted to the missile 30 and protrudes in aperature 41 (best seen in FIG. 6) in the rack 18. A pair of lug hooks 44A and 44B are pivotally attached to the rack 18 via pins 45A and 45B (best seen in FIGS. 7A and 7B) such that the hooks engage the lug 40 at substantially right angles to the longitudinal axis 31 of the missile. Sway braces 47A and 47B for stabilizing the missile 30 are attached to the hooks 44A and 44B and rotate therewith, respectively. Attached to the hooks 44A and 44B are cam followers 48A and 48B which are adapted to slideably engage cam surfaces typically in the form of wedge members 50A and 50B on the forward link 14.

Particularly referring to FIG. 9A the wedge members 50A and 50B are mounted to shaft 52 which in turn is rotatively mounted to the second end 14B of the forward link 14. The wedge members 50A and 50B are biased toward the cam followers 48A and 48B by coil springs 54A and 54B. Thus, when the positioning means 13 is in the stored position the cam followers 48A and 48B are wedged against wedge members 50A and 50B, respectively, with hooks 44A and 44B engaged with the lug 40. Thus, any tolerance build up is absorbed. Sway braces 45A and 45B are simultaneously brought to bear on the missile 30 providing lateral stability.

An actuator assembly 64 comprising frame member 65 and twin actuators 66A and 66B is pivotally attached at its first end 68A to the aircraft 10 and pivotally attached by its second end 68B to pin 19A on the rack 18 (again best seen in FIG. 9). The actuators 66A and 66B which will be subsequently discussed in detail, are preferably explosively actuated and is adapted to drive the positioning means 13 from the stored position (FIG. 1) to the release position (FIG. 2).

Figure 9B:
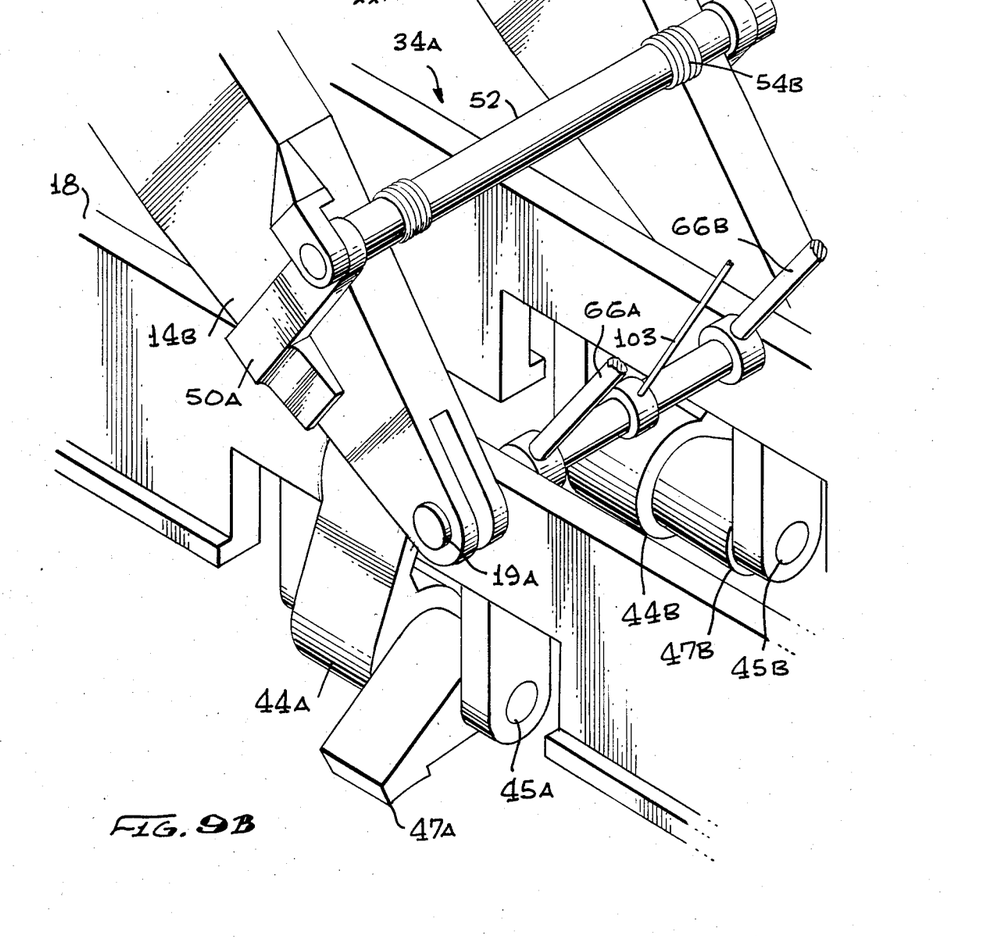

Particularly referring to FIGS. 9A and 9B it can be seen, that, as the positioning means 13 moves from the stored position, the angular relationship between the cam follwers 48A and 48B and the wedge members 50A and 50B, respectively change. At point B as indicated in FIG. 2 the cam followers 48A and 48B become free of the wedge members 50A and 50B and, thus, can rotate inboard (FIG. 9B). The cam followers 48A and 48B have a bevelled edge 60A and 60B such that these edges "fall" off the wedge members in a line to line contact. This provides as large a contact area as possible until the edges actually part. This reduces wear and provides a more precise release point. Once the cam followers are free, the missile 30 will move under its own inertia to push the hooks 44A and 44B away (as shown in FIGS. 7B and 9B). The actuator assembly 64 continues to drive the positioning means 13 to the release position during which the hooks 44A and 44B become completely clear of the lug 40 (position C in FIGS. 1 and 2). The missile 30 at this point separates from the rack 18 with a significant downward and forward velocity, the resultant of which is indicated by arrow 70.

Figures 7A, 11:
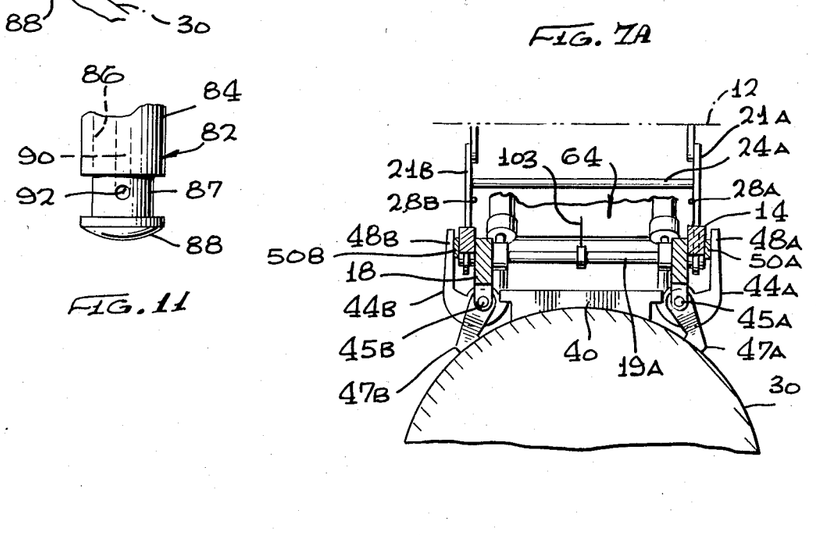
Figure 7B:
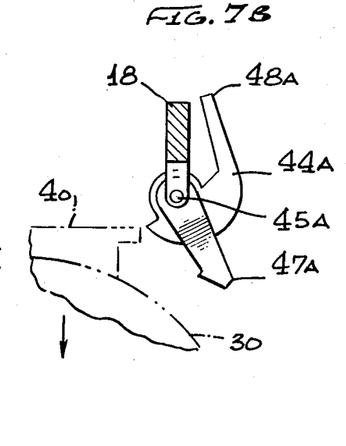
Figure 10:
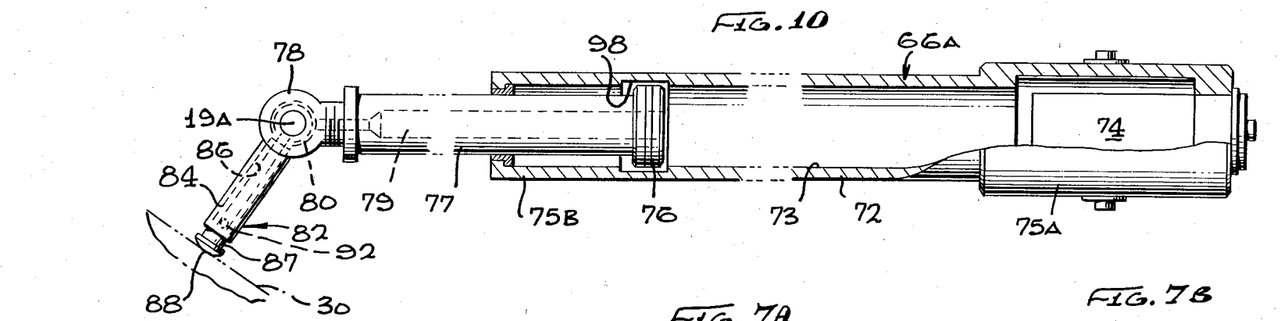

Referring now to FIGS. 10 and 11 which is a cross-sectional view of the actuator 66A it can be seen that the actuator comprises a cylinder 72 having a bore 73 incorporating an explosive cartridge 74 at its first end 75A. A piston 76 is moveably mounted in the bore 73 having a piston rod 77 which extends out end 75B of the cylinder 72. The piston rod 77 terminates in a fitting 78 for pivotally attaching to the pin 19A. The piston 76 and piston rod 77 have an internal passageway 79 extending from the piston to a hollow annular ring 80 in the fitting 78. A vent valve 82 is mounted to the fitting 78 which comprises a housing 84 having a bore 86 therein in communication with the annular ring 80. A piston 87 slideably mounted in the bore 86 and has a curved head portion 88 in slideable contact with the weapon 30. The piston also has an internal bore 90 which is coupled to the exterior of the piston by hole 92.

Thus, with the piston shown in FIG. 10 the hole 82 is sealed off in the bore 86 because the missile 30 in contact with head portion 88 the piston 86 remains in a retracted position wherein the hole 92 is covered. Upon ignition of the cartridge 74 the gases generated drive the piston 76 towards end 75B of the cylinder 72, thus causing the positioning means 13 to travel from the stored position to the release position. When the piston 76 comes toward the end of the stroke it uncovers a groove 98 in the cyliner 72 which allows the gases to bypass the piston 76 and snub the piston near the end of the stroke. The actuator continues to extend until the positioning means reaches the release position shown in FIG. 2 at which point the gas pressure will vent. Venting occurs after the weapon 30 is released because piston 87 in the valve 82 will now be allowed to open. Therefore, the gas pressure can flow through the piston 76 and piston rod 77 into the annular ring 80 in the fitting 78 and eventually out vent hole 92 in piston 87.

After the missile has been released the positioning means is returned to the stored position be means of retraction system 100 at which point the hooks 22A, 22B, 23A and 23B can be reengaged with the pins 19A and 19B of the links 14 and 16.

Referring particularly to FIGS. 1-3 and 9A retraction system 100 is simply a compression spring 102 mounted in a tube 104 in the aircraft structure. A plate 105 at end 96 of the spring 102 is coupled to a flexible cable 103 attached to the pin 19A. As the positioning means is extended, the compression spring 102 is compressed. Once the weapon is released, and the gas pressure in the actuator is vented the spring will extend pulling up the positioning means to the stored position.

Depending on the type of the missile carried the angle of release may change. In order to accommodate this, a system is provided for varying the release angle. Particularly referring the FIG. 1 it can be seen that the end 16A of link 16 has a plurality of holes 120. And the aircraft 10 incorporates a bracket 124 having a plurality of second holes 126. Thus the effective length of link 16 can be changed by changing the alignment of the first and second series of holes in which a pin 130 is used to secure the length thereto. Thus, referring now to FIG. 2 it can be seen by changing the effective length of the aft link 16, the "pitch rate" of a missile can be varied as indicated in dotted lines in FIG. 2.

While the invention has been described with reference to a particular embodiment, it should be understood that the embodiment is merely illustrative as there are numerous variations and modificatios which may be made by those skilled in the art. Thus, the invention is to be construed as being limited only by the spirit and scope of the appended claims.

INDUSTRIAL APPLICABILITY

The invention has applicability on weapon carrying military aircraft.

I claim:

1. A weapon dispensing system for ejecting a weapon from an aircraft comprising:
   weapon positioning means for positioning the weapon in a stored position and a release position comprising:
   a weapon support rack; and
   fore and aft links having first and second ends, said first ends of said fore and aft links pivotally coupled to the aircraft and said second ends of said fore and aft links pivotally coupled to said rack;
   an actuator means having a first end coupled to the aircraft and a second end coupled to said weapon positioning means, said actuator means for moving said weapon positioning means from the stored position to the release position; and
   fore and aft weapon attaching means for releasably locking the weapon to said rack comprising: the weapon having fore and aft mounting lugs; fore and aft hook means rotatably mounted to said rack moveable from a first position in engagement with said fore and aft mounting lugs, respectively, to a second position disengaged therefrom;
   fore and aft wedge members mounted to said positioning means for engaging with and locking said fore and aft hook means in said first position when said positioning means is in said stored position and disengaging from and unlocking said fore and aft hook means when said positioning means is in said release position allowing said fore and aft hook means to move from said first position to second position disengaged from said lug means.

2. The system of claim 1 wherein said fore and aft hook means includes fore and aft cam follower means attached thereto, in detachable engagement with said fore and aft wedge members, respectively.

3. The system of claim 2 including sway braces mounted to said fore and aft hook means, said sway braces movable from a first position in contact with the weapon when said fore and aft hook means are engaged with said mounting lugs to a second position disengaged therefrom when the weapon is unlocked from said rack.

4. The system of claim 3 further including means to vary the length of said aft link.

5. The system of claim 4 wherein said means to vary the length of the aft link comprises;
   said aft link having a plurality of longitudinally aligned first holes in proximity to said first end thereof;
   the aircraft having a plurality of second holes about the pivot point of said first end of said aft link;
   pin means adapted to pass through one of said plurality of said first holes and one of said plurality of second holes to lock said aft link to said aircraft;
   such that the distance between said first and second ends of said aft link can be varied thus, varying the angle at which the weapon is released when the weapon reaches the release position;

6. The system of claim 5 wherein;
   said fore and aft lugs have a T-shaped cross-section; and
   said fore and aft hook means comprise first and second forward hooks and first and second aft hooks for engaging said fore and aft lugs from opposite sides.

7. The system of claims 6 wherein said first and second forward hooks and said first and second aft hooks engage said fore and aft lugs from substantially right angles to the longitudinal axis of the weapon.

8. The system of claim 7 wherein;
   said fore and aft wedge members comprise first and second forward wedge members and first and second aft wedge members, respectively, mounted on said fore and aft links, respectively; and
   said fore and aft cam follower means comprise first and second forward cam followers mounted to said first and second forward hooks and first and second aft cam followers mounted to said first and second aft hooks, respectively, said first and second forward cam followers and said first and second aft cam followers in detachable contact with said respective wedge members for locking the weapon to said rack when said positioning means is in said stored position and to only release said weapon by disengaging from said wedge members when said positioning means is in said release position.

9. The system of claim 8 wherein said actuator means is an explosively actuated actuator.

* * * * *